(12) United States Patent
Sharma et al.

(10) Patent No.: US 7,979,766 B2
(45) Date of Patent: Jul. 12, 2011

(54) ARCHITECTURE FOR A MESSAGE BUS

(75) Inventors: Manish Sharma, Sikar (IN); Rakesh Roshan, Samba (IN); Manjunath Bittanakurike Narasappa, Bangalore (IN); Bhavani Shanker Arunachalam, Bangalore (IN); Suresh Radhakrishna, Bangalore (IN); William Clement, Trivandrum (IN); Joe Jaisingh, Bangalore (IN)

(73) Assignee: Centre for Development of Telematics, New Delhi (IN)

( * ) Notice: Subject to any disclaimer, the term of this patent is extended or adjusted under 35 U.S.C. 154(b) by 1160 days.

(21) Appl. No.: 10/595,538

(22) PCT Filed: Sep. 8, 2004

(86) PCT No.: PCT/IN2004/000283
§ 371 (c)(1),
(2), (4) Date: Apr. 27, 2006

(87) PCT Pub. No.: WO2006/027791
PCT Pub. Date: Mar. 16, 2006

(65) Prior Publication Data
US 2010/0115357 A1    May 6, 2010

(51) Int. Cl.
*G06F 13/364* (2006.01)
(52) U.S. Cl. .................... 714/748; 709/225
(58) Field of Classification Search ............... 714/748; 709/225
See application file for complete search history.

(56) References Cited

U.S. PATENT DOCUMENTS

| | | | |
|---|---|---|---|
| 4,634,110 A | | 1/1987 | Julich et al. |
| 4,695,952 A | | 9/1987 | Howland |
| 4,719,621 A | * | 1/1988 | May .............................. 370/402 |
| 4,734,909 A | * | 3/1988 | Bennett et al. ................ 370/462 |
| 4,763,249 A | * | 8/1988 | Bomba et al. ................. 713/600 |
| 4,870,704 A | * | 9/1989 | Matelan et al. ............... 710/120 |
| 5,001,704 A | | 3/1991 | Narup et al. |
| 5,261,105 A | | 11/1993 | Potter et al. |
| 5,377,332 A | | 12/1994 | Entwistle et al. |
| 5,459,840 A | * | 10/1995 | Isfeld et al. .................... 710/240 |
| 5,564,025 A | | 10/1996 | De Freese et al. |
| 5,579,406 A | | 11/1996 | Morikawa |
| 5,748,917 A | * | 5/1998 | Krein et al. ..................... 710/307 |
| 5,784,547 A | | 7/1998 | Dittmar et al. |
| 5,787,095 A | | 7/1998 | Myers et al. |
| 5,987,549 A | | 11/1999 | Hagersten et al. |
| 6,209,053 B1 | * | 3/2001 | Kurts ............................ 710/113 |
| 6,317,417 B1 | | 11/2001 | Childs et al. |
| 6,339,807 B1 | | 1/2002 | Yasue |
| 6,393,500 B1 | * | 5/2002 | Thekkath ........................ 710/35 |
| 6,490,293 B1 | | 12/2002 | Barker |

(Continued)

OTHER PUBLICATIONS

International Search Report (PCT Article 18 and Rules 43 and 44) from the Patent Cooperation Treaty, Form PCT/ISA/210, pp. 1-3, International application No. PCT/IN04/00283, Dated: May 11, 2005.

(Continued)

*Primary Examiner* — Stephen M Baker
(74) *Attorney, Agent, or Firm* — Narendra Reddy Thappeta

(57) ABSTRACT

An aspect of the present invention reduces the additional number of signal lines of a bus for control signals by using a set of signal lines to transfer data bits in some durations and to transfer control signals in some other durations. In one embodiment, the same signal lines are used to transfer data in a data transfer phase, and for bus arbitration in a bus arbitration phase. As a result, the total number of signal lines of a bus (bus width) is reduced. According to another aspect of the present invention, an arbitrator block allocates the bus to one of the requesting modules according to an assigned priority and least recently used (LRU) policy.

16 Claims, 7 Drawing Sheets

U.S. PATENT DOCUMENTS

| | | |
|---|---|---|
| 6,493,393 B1 | 12/2002 | Pignault |
| 6,501,766 B1 | 12/2002 | Chaar et al. |
| 6,684,279 B1 * | 1/2004 | Kruse et al. ............ 710/241 |
| RE38,428 E | 2/2004 | Kelly et al. |
| 6,701,398 B1 * | 3/2004 | Wyland ............ 710/107 |
| 7,340,548 B2 * | 3/2008 | Love ............ 710/305 |
| 2004/0073729 A1 | 4/2004 | Kniffler et al. |

OTHER PUBLICATIONS

Written Opinion of the International Searching Authority (PCT Rule43bis.1)from the Patent Cooperation Treaty, Form PCT/ISA/237, pp. 1-4, International application No. PCT/IN04/00283, Dated: May 11, 2005.

* cited by examiner

ARCHITECTURE FOR A MESSAGE BUS

RELATED APPLICATIONS

The present application is related to and claims priority from the International Application No. entitled, "A Novel Architecture for a Message Bus", Application Number: PCT/IN04/002835, Filed: Sep. 8, 2004, naming the same inventors as in the subject patent application.

BACKGROUND OF THE INVENTION

1. Field of the Invention

The present invention relates to message bus architectures used in digital systems, and more specifically to a method and apparatus for reducing the number of additional signal lines to be provided for control signals in a message bus.

2. Related Art

A parallel message bus (hereafter "message bus") generally contains a number of signal lines, which can transfer signals in parallel. In a typical scenario, multiple modules are connected to a message bus, and each module can send data (in the form of signals) to the other modules using the message bus. An arbitrator generally grants ownership of the message bus to only one of the modules, which can then send data to one or more of the other modules using the signal lines in the message bus.

Signal lines (contained in the message bus) generally need to support various control/status paths (in addition to data paths) to supervise the flow of data between various modules connected to the message bus. The control/status signals, for example, may represent signals such as bus request, bus grant (allocation) and signals which depict current status of the modules and status of the data transfer.

A parallel message bus is often designed to meet several requirements such as reduction in the width of the bus, support for higher bandwidth, etc. Reducing the width of the bus leads to corresponding reduction in number of interconnections (resulting in reduced cost of the system), reduction in power consumption as well as reduced area requirements.

In one prior embodiment referred to as a Peripheral Component Interconnect (PCI) bus supporting 64-bit data transfer, the bus is defined with 64 signal lines to transfer 64 data bits in parallel, and a number of additional signal lines dedicated for control purposes (and the number of such paths supporting control/status signals is high). It maybe desirable to reduce such number of additional signal lines required for sending control signals (or, the bus width, in general) further.

BRIEF DESCRIPTION OF THE DRAWINGS

Various features of the present invention will be described with reference to the following accompanying drawings.

SUMMARY

Figure 1:
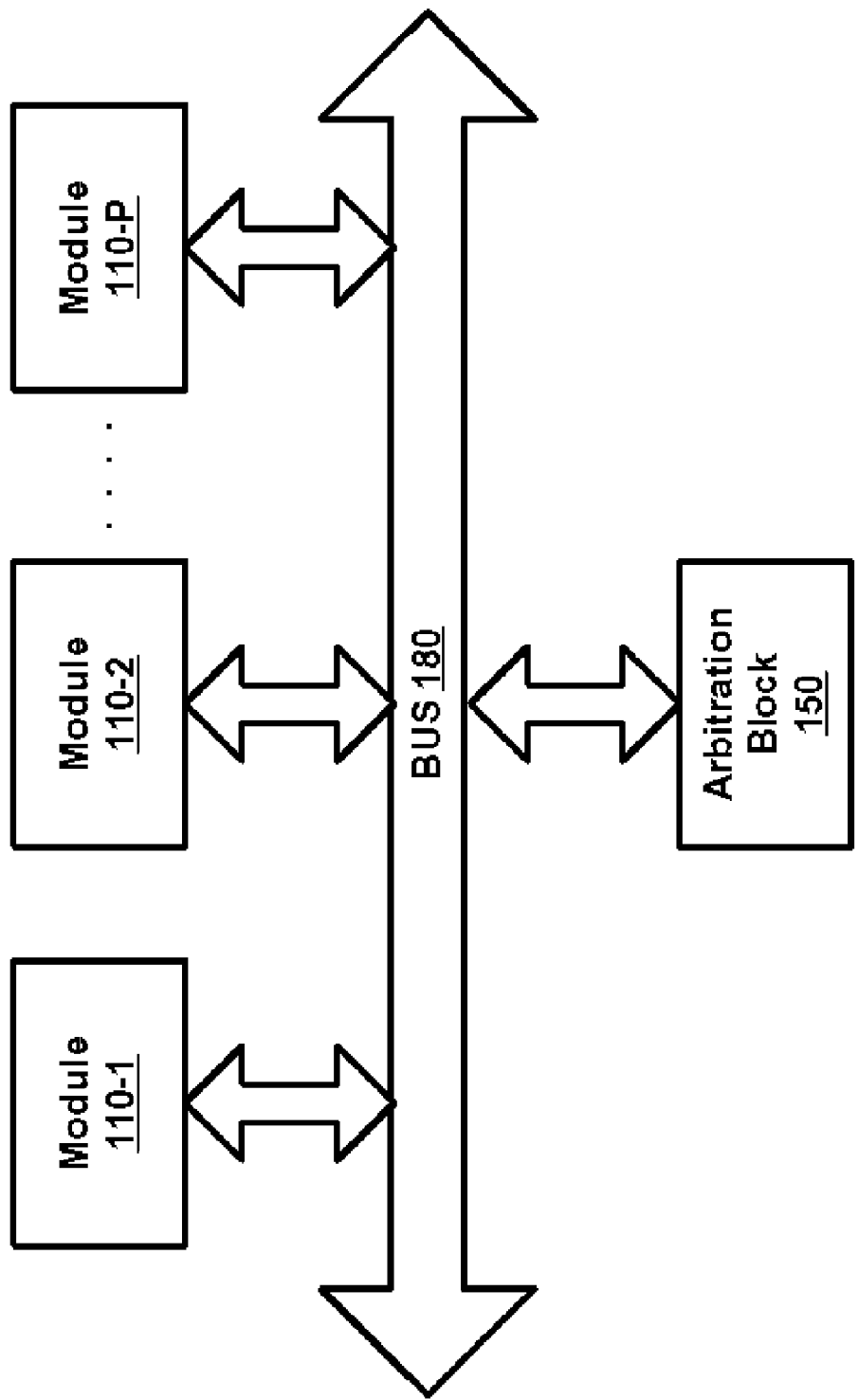
FIG. 1 is a block diagram of an example system in which several aspects of the present invention can be implemented.

An aspect of the present invention provides an improved approach to operating a message bus serving to transfer data between module connected to the message bus. In an embodiment, a first set of signal lines contained in the message bus are used to send control signals in a first duration, and to send data bits between the modules in a second duration. Due to the use of the same signal lines for such multiple purposes, the aggregate number of physical signal lines required in the message bus may be reduced.

In one implementation, the first duration represents an arbitration phase in which modules request for ownership of the message bus using the first set of signal lines, and the second duration represents a data transfer phase in which a first module allocated the message bus transfers data on the message bus using the first set of signal lines.

The first module may further send an address of a second module using the first set of signal lines, wherein the data bits are sent by the first module to the second module in the data transfer phase (which follows the sending of the address). In one embodiment, the first set of signal lines comprise one of a request line on which a first module requests the message bus for transmission of data and a grant line on which the first module is indicated that the message bus has been granted.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview

An aspect of the present invention reduces the width of a message bus (hereafter "bus") by multiplexing data bits, address bits (to indicate the address of the recipient module) and control signals in the same signal line in different time durations. In one embodiment, the signal line is used by a module for requesting ownership of the bus and another signal line is used by an arbitration block for indicating a grant allocating the bus to a specific module. Thus, the same signal line is used to transfer address in an address phase, data in a data transfer phase and control signal in bus arbitration phase (i.e., when the data or address is not being transferred). Due to such use of a signal line, the aggregate number of signal lines (bus width) can be reduced.

According to another aspect of the present invention, an arbitrator block allocates the bus to various modules according to a least recently used (LRU) policy. That is, in case multiple modules request the bus at the same time, the module which has not used the bus recently (in time domain) is allocated the bus. Alternatively, the modules may be grouped according to different priorities, with a lower priority group being granted the bus only if modules of higher priority are not requesting the bus. The LRU policy may be implemented in allocating the bus to modules within each group.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example System

FIG. 1 is a block diagram of an example system in which several aspects of the present invention can be implemented. The system may correspond to any digital system (both processing and communication systems) such as, without limitation, a computer system, a router, telecom switch, a server, etc. The block diagram is shown containing only a few modules connected to a bus, however, systems may be implemented with more/fewer modules and also more buses (e.g., for redundancy) without departing from various aspects of the present invention.

The block diagram is shown containing modules 110-1 through 110-P, arbitration block 150 and bus 180. It is assumed that arbitration block 150 operates to allocate the bus to one of the modules requesting for ownership (for exclusive transmission of data) of the bus. However, any module (110-1 through 110-P) connected to bus 180 may operate as an arbitration block. The width of bus 180 can be reduced as described below in further detail.

Modules 110-1 through 110-P transmit/receive data using (the data paths portion of or data path signal lines) shared bus 180. Modules 110-1 through 110-P may transmit/receive data/signal as needed for tasks such as arbitration of bus 180, error detection/correction, etc. The modules represent components such as (without limitation) central processing units, input/output interface modules, special purpose processor modules (e.g., digital signal processing units), etc. The modules may be provided in various forms such as cards/boards which plug into a system.

Arbitration block 150 receives requests for exclusive access to bus 180 potentially from several modules, and determines a module to which the bus is to be allocated. Priority of the requests received from modules (ready to send data to other module(s)) are resolved according to a specified logic and a grant signal is sent to a module to which the bus is allocated. Some considerations in an example implementation of arbitration block 150 are described in a section below.

Bus 180 provides signal lines supporting transfer of data/signals from one module to another. A bus architecture may specify the number of signal lines (i.e., bus width) in bus 180.

An aspect of the present invention enables the bus width to be reduced by using the same signal line for transferring data in some durations, address in some other durations and for bus arbitration in durations when data or address is not being transferred. In one embodiment, a 64 bit transfer with 8 bit error correcting codes (ECC) is supported using 77 signal lines. The manner in which each signal line is used is described briefly below. The manner in which the modules may use the signals is described in detail then.

3. Embodiment of a Bus Architecture

Figure 2:
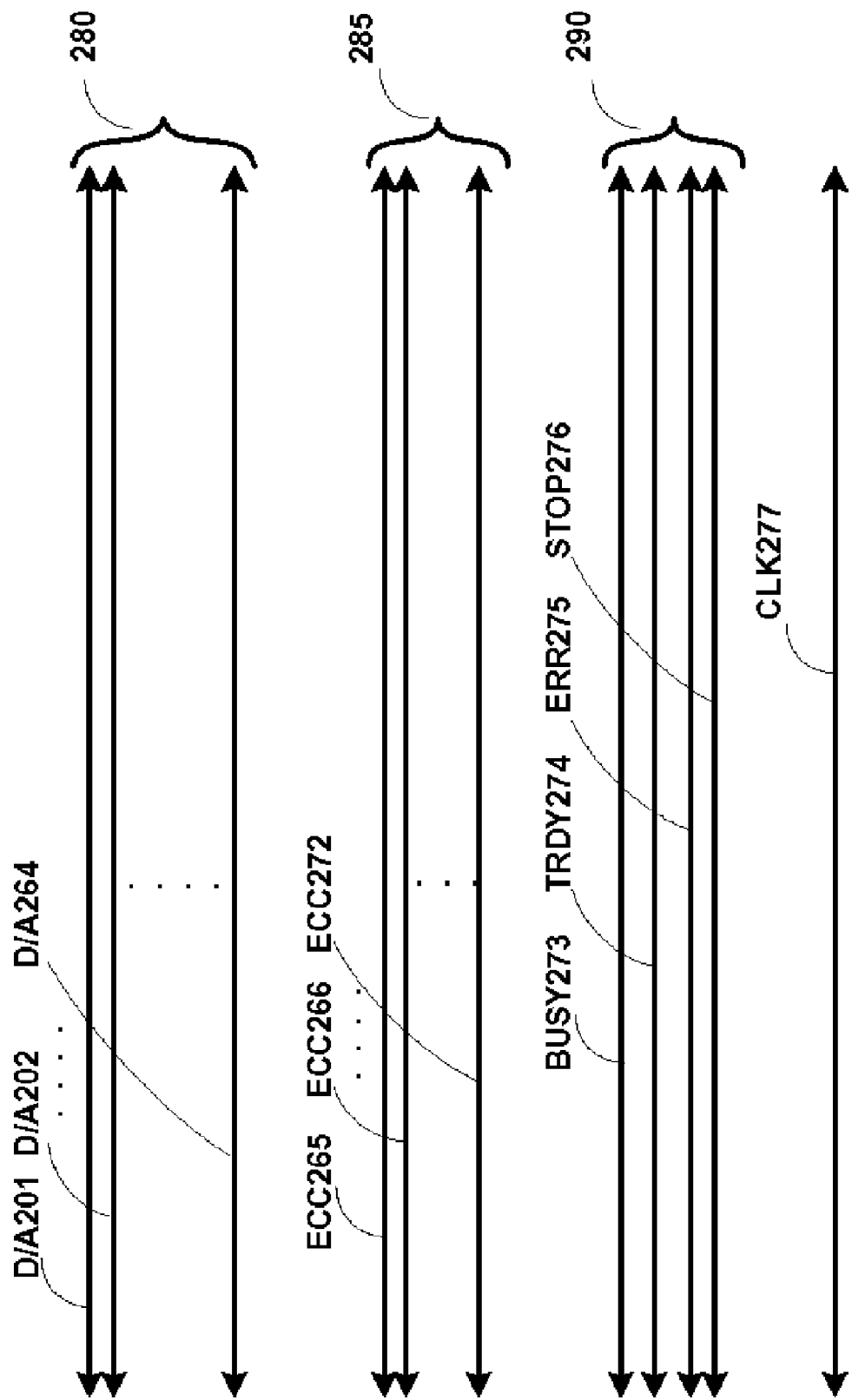
FIG. 2 is a diagram depicting the signal lines contained in a message bus in an embodiment of the present invention.

FIG. 2 is a diagram depicting the signal lines contained in message bus 180 in an embodiment of the present invention. Broadly, the message bus is shown containing four group of signal lines: data/arbitration (D/A) group, error correcting code (ECC) group, control group and clock group. Each group is described below.

Data/arbitration (D/A) group 280 contains 64 signal lines D/A201 through D/A264, which can be used by modules 110-1 through 110-P to send data bits in a data transfer phase. Also, each module may arbitrate for the bus (during bus idle phase) using the same signal lines to send a request (e.g., on D/A201) and receive a bus grant/reject (e.g., on D/A202) signal line in a bus arbitration phase. Two signal lines (one for sending bus request and another for receiving bus grant, in D/A group) may be used by each module to arbitrate for the bus during arbitration phase.

Error correcting code (ECC) group 285 contains 8 signal lines ECC 265 through ECC272, which may be used to transmit bits corresponding to an error correction code. The code may be used to correct a few (1 bit of 64 bits) errors (at the receiving end) and detect 2 or more bits of errors (using any of known techniques), which may occur during transmission of bits on signal lines.

CLK277 represents a clock signal with reference to which data is transmitted and received by each module. The same clock may be provided to all the modules connected to bus 180.

Control group 290 contains four control signals BUSY273, TRDY274, ERR275 and STOP276, which are shared by all the modules. BUSY 273 may be asserted by a module after taking ownership (post-allocation) of the bus and released after completion of transfer of data. The asserted BUSY signal may be monitored by other modules. Modules requiring bus for transferring data may refrain from requesting for the bus till BUSY is de-asserted. Target Ready (TRDY 274) signal may be asserted by a receiving module indicating that the receiving module is ready to accept the data.

Error (ERR275) signal may be asserted by the receiving module (on path 275) to indicate (to the transmitting module) occurrence of an uncorrectable error in the received packet data (causing the transmitting module to re-transmit previous packet). Both ERR275 and STOP276 are asserted by the receiving module if error is deemed to have occurred in re-transmitted data and the transmitting module may terminate data transfer.

The description is continued with reference to the manner in which a module may be implemented to use the bus of FIG. 2 according to an aspect of the present invention.

4. Module

Figure 3:
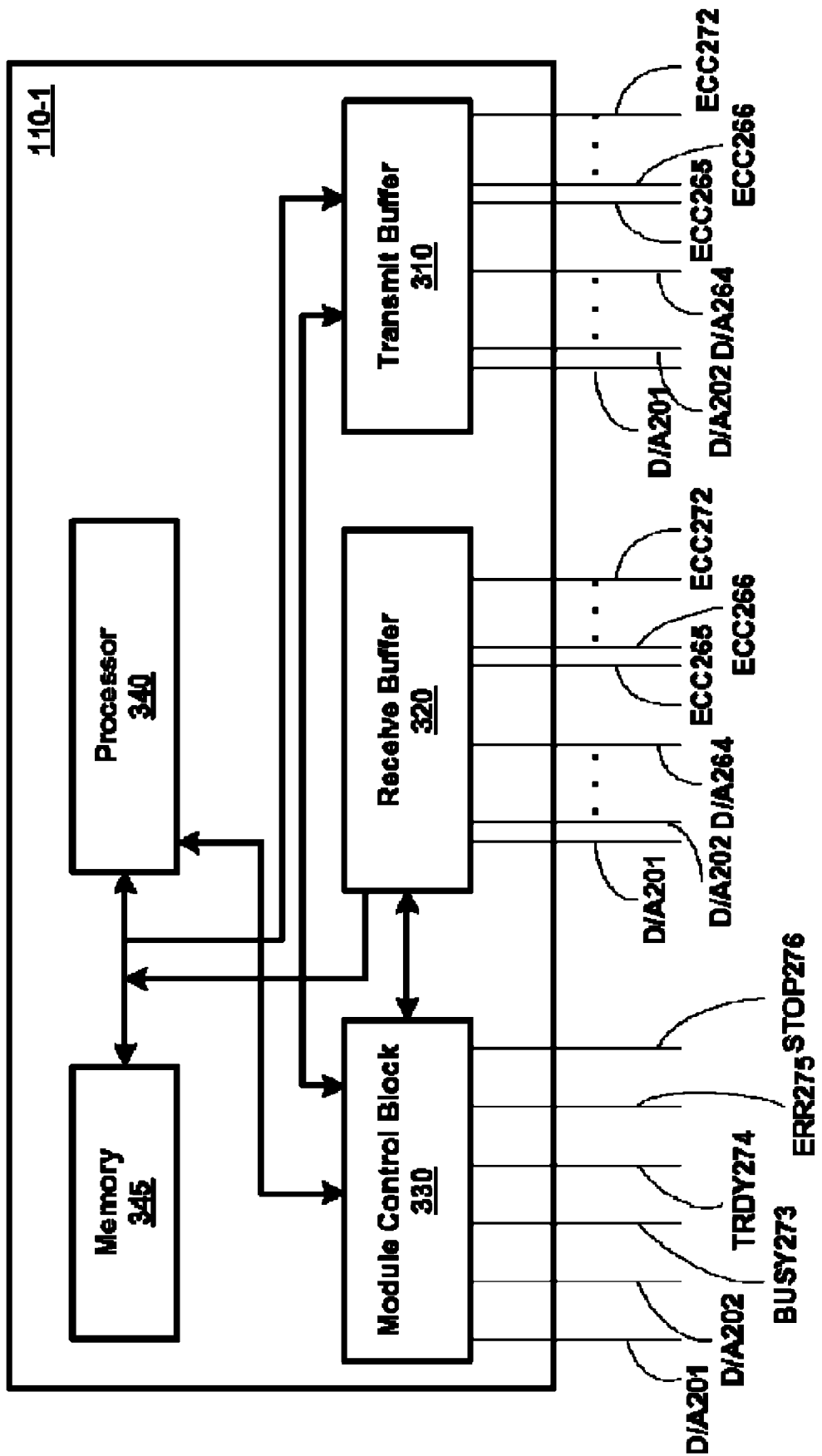
FIG. 3 is a block diagram depicting the details of a module implemented according to an aspect of the present invention.

FIG. 3 is a block diagram depicting the details of module 110-1 in an embodiment of the present invention. Module 110-1 is shown containing transmit buffer 310, receive buffer 320, module control block 330, processor 340 and memory 345. Each block is described below in further detail.

Transmit buffer 310 provides memory space to store data ready for transmission to other modules. Similarly, receive buffer 320 provides memory space to store data received from other modules. Memory 345 may store instructions (and data) executed by processor 340. Even though shown as three separate blocks, buffers 310/320 and memory 345 may be integrated into a single unit.

Processor 340 may execute instructions provided in memory 345 to generate data to be transmitted, and save the generated data in memory 345. The data stored in memory 345 may be transferred to transmit buffer 310 using techniques such as direct memory access (DMA). The target/receiving module may also be specified to module control block 330 by an appropriate interface (e.g., by storing a corresponding identifier in transmit buffer according to a convention).

Processor 340 may receive (from module control block 330) indication of presence of data in receive buffer 320, and transfers data from receive buffer 320 to memory 345. Techniques such as direct memory access (DMA) may be used to transfer data from receive buffer 320 to memory 345 without intervention of processor 340.

Module control block 330 interfaces with arbitration block 150 to gain exclusive access to transmit data (stored in transmit buffer 310), and transmits the data present in transmit buffer 310 on bus 180. Signal line 201 may be used to request ownership of the bus, and the grant request may be received on path 202. Once the bus is granted, both request and grant signal lines (201 and 202) may be used to transfer data/address along with other signal lines according to an aspect of the present invention.

Similarly, module control block 330 may operate to receive data transmitted by other modules 110-2 through 110-P, and store the received data in receive buffer 320. Error detection and correction may also be performed during the data transfers. The description is continued with reference to the manner in which module 110-1 may transmit and receive data in an embodiment of the present invention.

5. Transmit Mode

Figure 4:
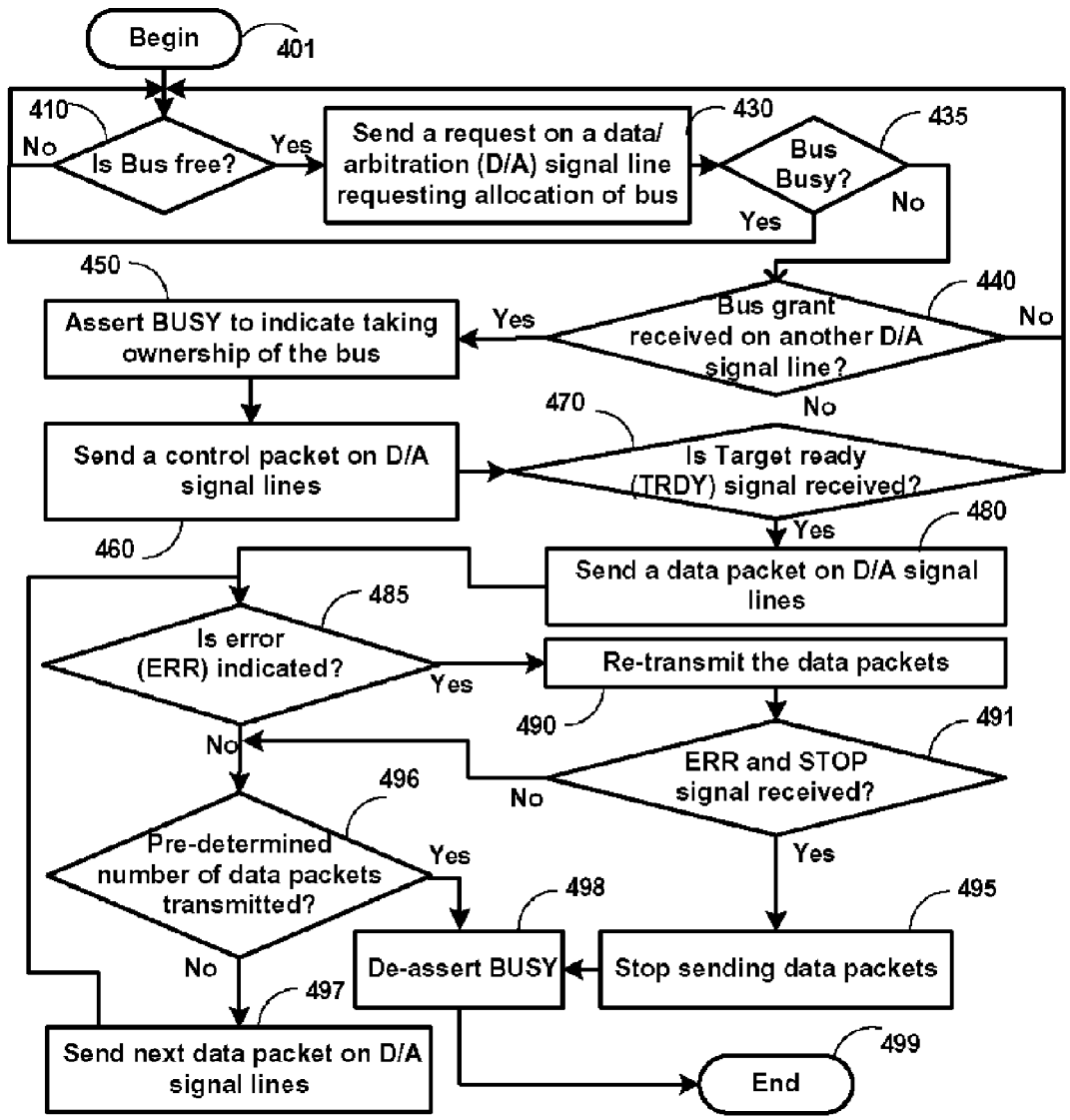
FIG. 4 is a flow-chart illustrating the details of a method by which a module operates in a transmit mode according to an aspect of the present invention.

FIG. 4 is a flow-chart illustrating a method by which module 110-1 operates (in transmit mode) to transfer data according to an aspect of the present invention. For illustration, the method is described with reference to FIGS. 1, 2 and 3, however, the method may be implemented by other types of modules and/or in other scenarios. The method begins in step 401 in which control is immediately transferred to step 410.

In step 410, module control block 330 (contained in module 110-1) determines whether bus is free by checking if BUSY273 is asserted. Bus 180 is deemed to be free if BUSY273 is not asserted, as described above with reference to FIG. 2. Control passes to step 430 if bus is free (indicating a bus idle phase) and loops back to step 410 otherwise (in normal operating conditions).

In step 430, module control block 330 sends a request on (or asserts) D/A path 201 requesting (arbitration block 150) allocation of bus 180 (in arbitration phase). In step 435, module control block 330 determines whether bus is busy and control passes to step 410 if bus is busy and to step 440 otherwise.

In step 440, module control block 330 examines D/A path 202 to determine whether bus grant is received. Control passes to step 450 if a grant is received and to step 410 if the bus grant is not received by the time BUSY273 is asserted (by some other module which has got the ownership of bus 180).

In step 450, module control block 330 asserts BUSY273 to indicate that ownership is taken by module 110-1. The assertion of BUSY273 indicates (to all other modules) that the bus is presently being used. Any other module may refrain from requesting allocation of the bus by examining BUSY273. As a result, module 110-1 transits from arbitration phase to address phase.

In step 460, module control block 330 (now operating in address phase) sends a control packet on data/arbitration path group (64 bits in the illustrative embodiment) containing control information. In one embodiment, module 110-1 now operating in address phase sends a control packet (on D/A201 through D/A264.) containing destination address (in 1st byte), source address (in 2nd byte), and the number of 64-bits ("packets") that a transmitting module would transmit (in 3rd byte) in the present allocation cycle.

The destination address (in 1st byte) may correspond to one of a direct address (of a receiving module), a broadcast address (of all modules connected to bus 180), and a group address (sub-set of modules connected to bus 180) while operating in direct addressing mode, broadcasting mode and group addressing mode respectively.

Addresses may be assigned to the modules using various techniques. In an embodiment, while the system is initialized, each module is assigned an address depending on the specific purpose for which the module is used. Such allocation/assignment of addresses may be performed using one of several known techniques. The manner in which the control packet is used by a receiving module is described below with reference to FIG. 5.

In step 470, module control block 330 determines whether a target ready signal (TRDY274) is received on a control path (274) (corresponding to the direct addressing scheme). As noted above and also described below with reference to FIG. 5, a recipient/receiver module asserts TRDY 274 to indicate readiness to receive data (in direct addressing mode). Control passes to step 480 if TRDY274 is received and to step 410 otherwise.

In step 480, module control block 330 sends a data packet (stored in transmit buffer310) on data path group (D/A201 through D/A264). The duration in which data packets are thus transmitted, may be referred to as a data transfer phase.

In step 485, module control block 330 determines whether an error is indicated on a control path (ERR275). Control passes to step 490 if error signal is indicated/asserted and to step 496 otherwise.

In step 490, module control block 330 may re-transmit the (previously transmitted) data packet. In step 491, module control block 330 examines whether ERR275 and STOP276 signals are asserted. Control passes to step 495 if the condition is true and to step 496 otherwise. In step 495, module control block 330 stops sending data packets and control is then passed to step 498.

In step 496, module control block 330 determines whether the pre-determined number of data packets are transferred. The pre-determined number of data packets may be indicated in a size field of control packet sent in step 460. Control then passes to step 497 if more of pre-determined number of packets need to be transferred and to step 498 otherwise. In step 497, module control block 330 sends next data packet on D/A201 through D/A264. Control then transfers to step 485 to transmit the following packet.

In step 498, module control block 330 de-asserts BUSY273 signal (asserted in step 450) indicating release of the bus (as data transfer phase is completed). The method ends in step 499.

Thus, by using a same signal line for bus arbitration, address and data transfer, the width of bus 180 may be reduced. However, it should be understood that merely to avoid obscuring various features of the present invention, some of the unneeded details have been simplified and/or not described.

Different combinations of the control signals can be used to indicate various complex events occurring during the data transfer. For example, both TRDY274 and STOP276 may be asserted together to indicate receive buffer 320 is full and an attempt may be made to transmit data at a later time point. Also, ERR275 and STOP276 signals may be used in a more complex way for superior error handling. The description is continued with reference to a method by which a module operates in receive mode.

6. Receive Mode

Figure 5:
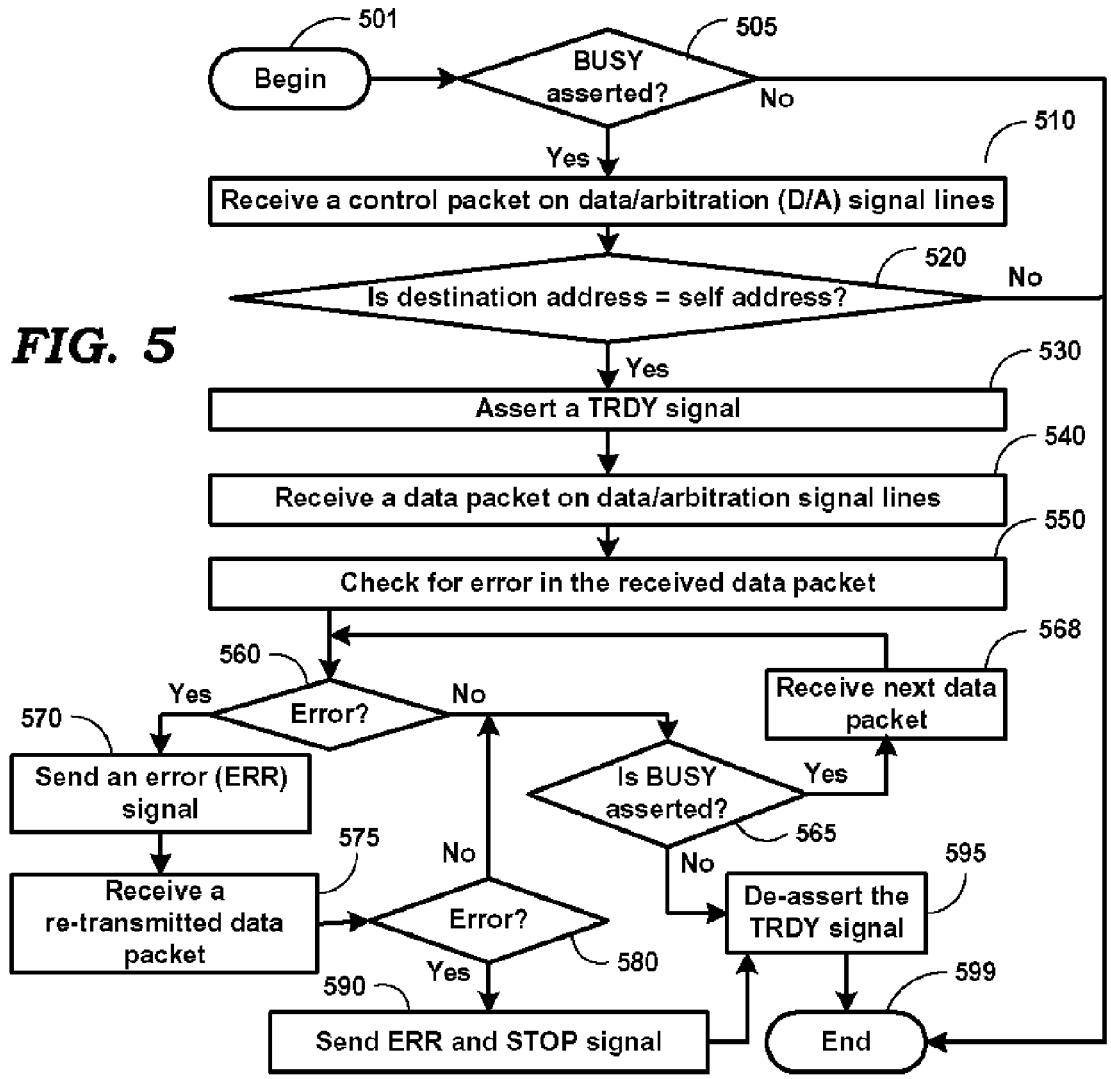
FIG. 5 is a flow-chart illustrating the details of a method by which a module operates in a receive mode according to an aspect of the present invention.

FIG. 5 is a flow-chart illustrating the details of a method using which module 110-1 operates (in receive mode) to receive data according to an aspect of the present invention. For illustration, the method is described with reference to FIGS. 2, 3 and 4, however, the method may be implemented by other types of modules and/or in other scenarios. The method begins in step 501 in which control is immediately transferred to step 505.

In step 505, module control block 330 determines whether BUSY273 is asserted (to check if bus 180 is busy). Control passes to step 510 if bus 180 is busy and to step 599 otherwise.

In step 510, module control block 330 receives (while module 110-1 is operating in address phase) a control packet on data/arbitration signal lines (D/A201 through D/A264) upon the assertion of BUSY273.

In step 520, module control block 330 determines whether the destination address is equal to a self address (i.e., a unique direct/unicast address allocated/assigned to module 110-1). Control passes to step 530 if both the addresses are equal and to step 599 otherwise. Similarly, even if the destination address equals a broadcast address (directed to all modules), or a group/multicast address directed to a group of modules including module 110-1, control passes to step 530.

In step 530, module control block 330 asserts a target ready (TRDY274) signal on control path 274 indicating that module 110-1 is ready to receive packets (64 bits each). In step 540, module control block 330 receives a data packet on data/arbitration signal lines 201 through 264. The received data packet is stored in receive buffer 320.

In step 550, module control block 330 determines whether error has occurred in the received data packet. Such a determination may be made by comparing the received error control code (on signal lines 265 to 272) with the bit code generated by an error detection/correction block (not shown) contained in module control block 330.

In step 560, if error is deemed to have occurred in the received data packet, control is transferred to step 570 and to step 565 otherwise. Alternatively, in an embodiment, an 8-bit error (correcting) code may be used, which allows for correction of a few bits (1 bit). Only if the number of errors exceeds 1 bit, control is transferred to step 570. Various error correction/detection approaches well known in the relevant arts may be used for such a purpose.

In step 565, module control block 330 determines whether BUSY273 is asserted. As noted above, the sending module continues to assert BUSY273 until completion of transmission of all the packets for the present allocation cycle. Control passes to step 568 if BUSY273 is asserted and to step 595 otherwise. In step 568, module control block 330 receives next data packet, and control passes back to step 560.

In step 570, module control block 330 sends an error signal (ERR275) on control path 275. In step 575, re-transmitted packet may be received in response. In step 580, module control block 330 determines whether error has occurred in the received (i.e., re-transmitted) data packet. Control passes to step 590 on occurrence of error and to step 565 otherwise.

In step 590, module control block 330 sends an error (ERR275) signal and stop (STOP) signal on paths 275 and 276 respectively. The error signal (ERR275) indicates that an error has occurred with respect to the previously received packet, and the stop signal (STOP 276) causes the transmitting block to cease transmitting additional packets. Control then passes to step 595.

In step 595, module control block 330 de-asserts TRDY274 in response to BUSY273 being de-asserted or after asserting the STOP276 and ERR275 signals. Control then passes to step 599 in which the method ends. Thus, a module may operate to receive data according to an aspect of the present invention. The description is continued with reference to the details of an embodiment of arbitration block 150 implemented according to an aspect of the present invention.

7. Arbitration Block

Figure 6:
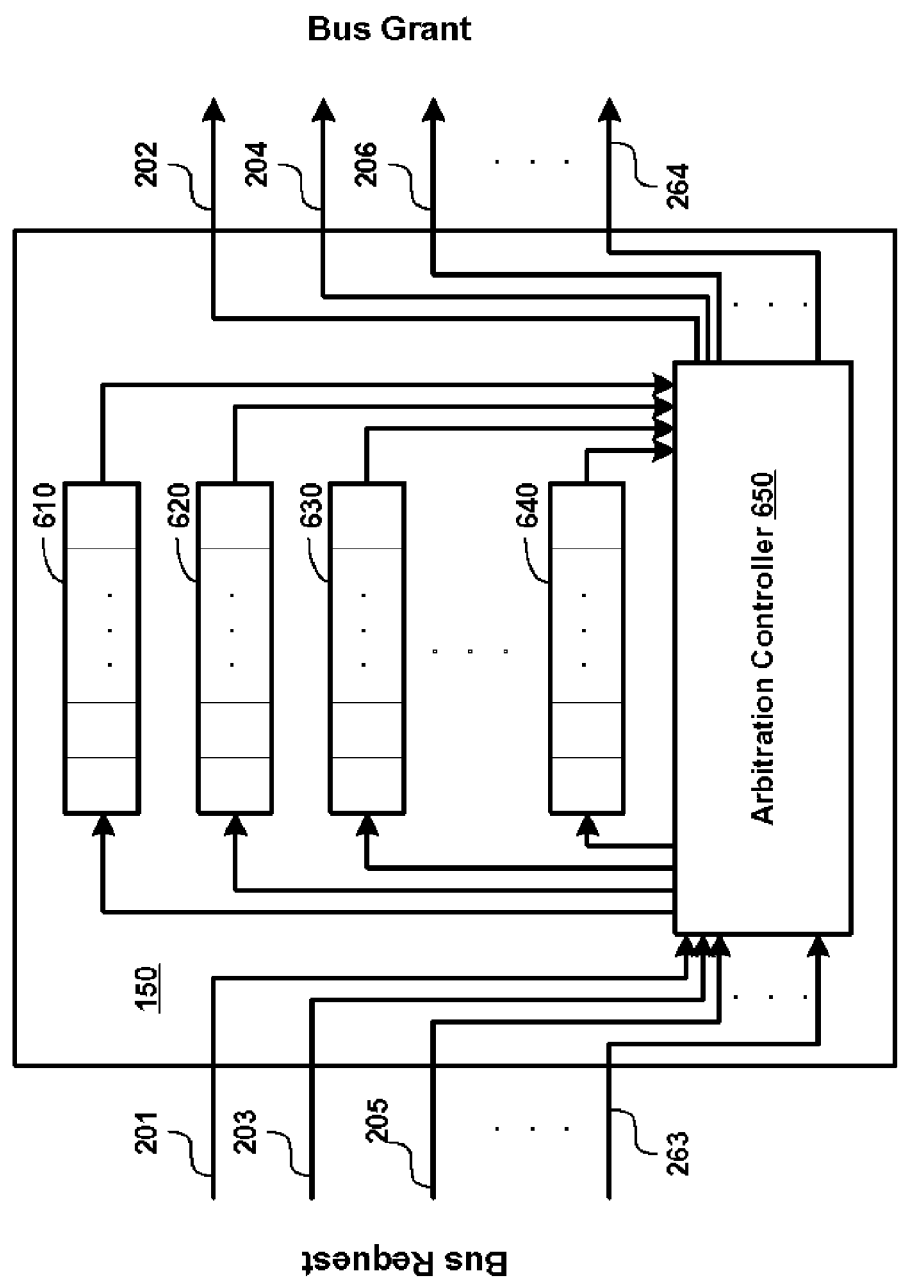
FIG. 6 is a block diagram of an arbitration block implemented according to an aspect of the present invention.

FIG. 6 is a block diagram illustrating the manner in which an arbitration block may provide prioritization in allocation of bus 180 according to an aspect of the present invention. The block diagram is shown containing priority queues 610, 620, 630 and 640 and arbitration controller 650. Each component is described in detail below.

Broadly, a user may assign each module to one of the priority queues. Modules assigned to lower priority queues are allocated the bus only if requests are not received from modules assigned to higher priority queues. Within each priority queue, modules may be allocated the bus according to least recently used (LRU) policy. The manner in which such features may be implemented is described below in further detail.

Priority queues 610, 620, 630 and 640 store data indicating the order in which modules of corresponding priority have been allocated bus 180 in the prior durations. The data enables implementation of LRU policy within each priority queue. For illustration, it is assumed that priority queues 610, 620, 630 and 640 are in decreasing order of priority (i.e., priority queues 610 and 640 respectively having highest and lowest priority).

In one embodiment, each module in a queue is represented by a single token, and the token is pushed to the back of the queue upon allocation of the bus to the corresponding module. Thus, a module at the front of the priority queue is allocated bus 180 if more than one module within a queue requests access to the bus at the same time. Within a single priority queue, only that requesting module wins the ownership of the bus which is ahead of all other requesting modules (i.e., whose token is ahead in the queue).

Arbitration controller 650 receives requests requesting allocation of bus from multiple modules and grants a request to one of the modules during the time when the bus is idle. As described above, the request from each module may be received on a corresponding one of the D/A signal lines (201, 203, 205, in general odd numbers up to 263).

Arbitration controller 650 may first determine the priority queue to which each requesting module is assigned to, and whether any of the modules of a higher priority queue are present before allocating bus 180 to requesting module of lower priority. Once it is determined that there is at least one module of a given priority requesting bus 180, arbitration controller 650 then examines the corresponding priority queue to determine the specific one of the requesting modules having the corresponding token at front.

The requesting module corresponding to the token at the front of the queue is granted the bus by asserting the corresponding one of D/A signal line (202, 204, 206, in general even numbers up to 264). Thus, arbitration block 150 determines the module to which bus has to be allocated based on priorities between queues and with LRU approach within a queue. The token corresponding to a module to which bus 180 is granted is pushed to the back of the queue. The operation of arbitration block 150 is summarized below with reference to FIG. 7.

Figure 7:
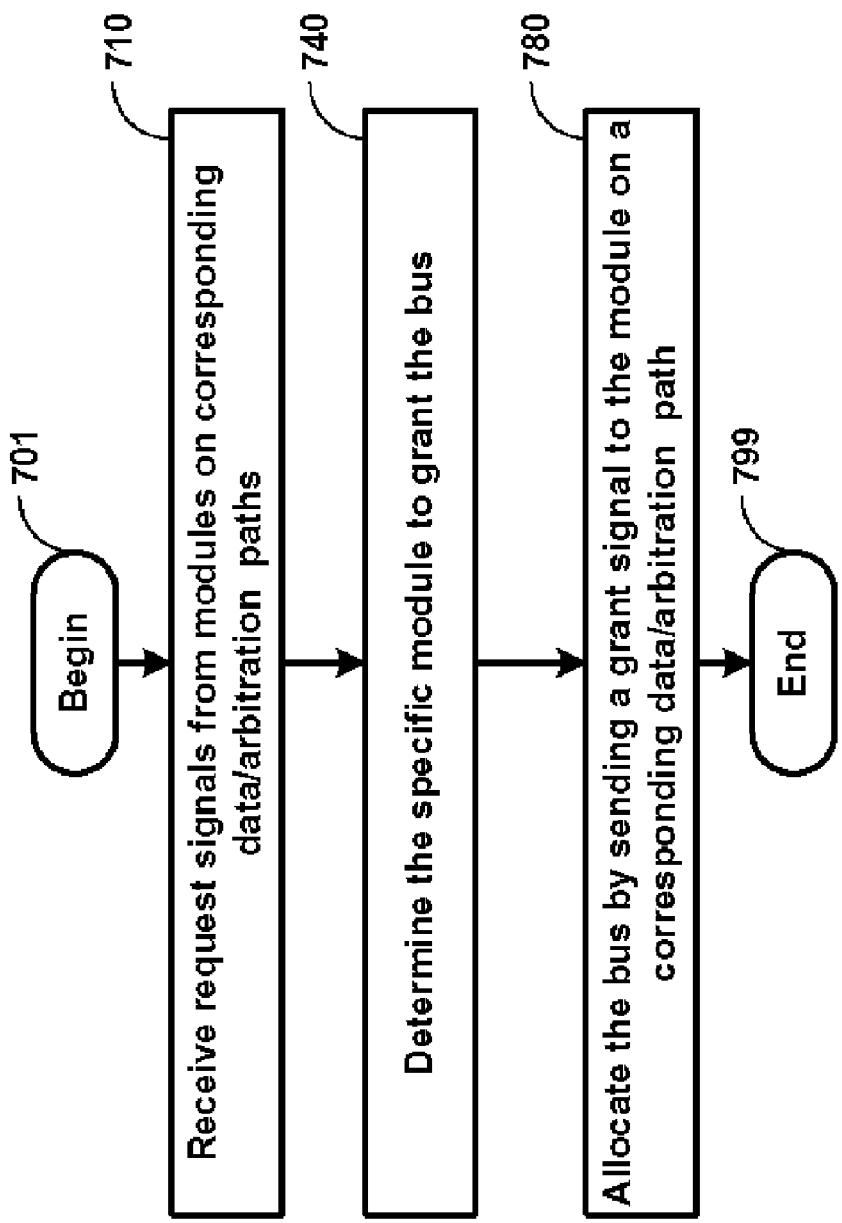
FIG. 7 is a flow-chart illustrating the details of a method by which an arbitration module operates to allocate a bus to one of the requesting modules according to an aspect of the present invention.

FIG. 7 is a flow-chart summarizing the operation of arbitration module in one embodiment. For illustration, the method is described with reference to FIGS. 1, 2 and 6. The method begins in step 701 in which control is immediately transferred to step 710.

In step 710, arbitration controller 650 receives requests from potentially multiple modules on corresponding data/arbitration paths (when bus 180 is free). Requests may be received on signal lines D/A 201, D/A 203 and D/A263 from modules 110-1, 110-2 and 110-P respectively.

In step 740, arbitration controller 650 determines the specific module to grant (access right to transmit on) bus 180. Approaches such as those described above with reference to FIG. 6 may be used in determining the specific module to which to grant bus 180.

In step 780, controller 650 allocates the bus by asserting the corresponding one of the D/A signal lines 202, 204, 206, etc. Assuming that module 110-1 is allocated bus 180, a grant signal may be sent on D/A 202. The method ends in step 799.

Thus, by using the same signal path to support data path in some durations and to support control/status path (for bus arbitration and addressing in the above example), the bus width can be reduced according to several aspects of the present invention.

8. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of operating a message bus serving to transfer data between a plurality of modules, said plurality of modules being connected to said message bus, said method comprising:

using all of a first set of signal lines to send control signals in a first duration representing an arbitration phase in which one or more of said plurality of modules, including a first module, request ownership of said message bus using said first set of signal lines, said first set of signal lines being comprised in said message bus, wherein said first set of signal lines comprise a request line on which said first module requests said message bus for transmission of data, said first set of signal lines also comprising a grant line on which said first module is indicated that said message bus has been granted for transmission of data;

sending an address of a second module from said first module using said first set of signal lines, wherein said first module sends said address of said second module after being allocated said message bus; and using all of said first set of signal lines to send data bits from said first module to said second module in a second duration, wherein said second duration represents a data transfer phase in which said first module allocated said message bus transfers said data bits on said message bus using all of said first set of signal lines.

2. The method of claim 1, further comprising:
receiving in an arbitration block said request on said request line;
determining a first priority group in which said first module is assigned, wherein said first priority group is contained in a plurality of priority groups, wherein a second priority group has a higher priority than said first priority group;
allocating said message bus to said first module only if request for said message bus is not received from any modules in said second priority group, wherein said allocating allocates said message bus according to a least recently used (LRU) approach among modules in said first priority group if more than one module in said first priority groups requests said message bus.

3. The method of claim 1, wherein said using all of said first set of signal lines to send control signals in said arbitration phase comprises:
determining in said first module whether a BUSY signal line is asserted, wherein said BUSY signal line indicates whether any of said plurality of modules is transmitting on said message bus;
requesting from said first module ownership of said message bus by sending a request on said request line if said BUSY line is not asserted; and
receiving a bus grant signal from an arbitration controller on said grant line, wherein said grant signal indicates allocation of said message bus to said first module.

4. The method of claim 3, wherein said first module includes said address of said second module in a control packet, wherein said control packet indicates a number of data packets to be sent by said first module to said second module.

5. The method of claim 4, wherein said using said first set of signal lines as data paths in said second duration comprises:
asserting in said first module said BUSY line to indicate ownership of said message bus;
examining a TRDY line to determine whether said second module is ready to receive said number of packets after sending said address on said message bus, wherein said second module is designed to assert said TRDY line when ready to receive; and
sending from said first module said number of data packets on said message bus, wherein some bits of each of said number of data packets is sent on said first set of signal lines.

6. The method of claim 5, further comprising:
receiving said control packet in said second module;
determining in said second module that said number of packets are directed to said second module by comparing said address to a self address of said second module; and
asserting said TRDY line to indicate that said second module is ready to receive said number of packets.

7. The method of claim 6, further comprising:
determining in said second module whether an uncorrectable error is present in a first packet, wherein said first packet is comprised in said number of data packets;
asserting an ERR signal in said second module to indicate presence of said uncorrectable error;
transmitting said first packet again from said first module upon said ERR signal being asserted;
receiving said packet again and performing said determining and asserting ERR and STOP signal in said second module if said uncorrectable error is present again; and
terminating transferring in said first module after determining both said ERR and said STOP is asserted.

8. The method of claim 7, wherein said message bus contains only 4 control signal lines.

9. A system comprising:
a message bus containing a plurality of signal lines including a first signal line;
a first module and a second module sharing said message bus to transfer data to each other, an arbitration module allocating said message bus to one of said first module and said second module, wherein said first module requests access to transmit data on said message bus using said first signal line, said first module further transmitting a bit of each of a plurality of packets to said second module on said first signal line, wherein said message bus comprises a second signal line, said arbitration module indicating that said message bus is granted to said first module on said second signal line, wherein said first module transmits another bit of each of said plurality of packets on said second signal line to said second module.

10. The system of claim 9, further comprising a plurality of modules including said first module and said second module, wherein each of said plurality of modules is assigned to one of a plurality of priority groups, said plurality of groups including a first priority group and a second priority group, wherein said first module is assigned to said first priority group, said second priority group having a higher priority than said first priority group, wherein said arbitration module allocates said message bus to modules in said first priority group only if a request is not received from any modules in said second priority group, said arbitration module allocating said message bus to modules in said first priority group according to a least recently used (LRU) approach.

11. The system of claim 9, further comprising a plurality of modules including said first module and said second module, wherein said message bus further comprises a BUSY line shared by each of said plurality of modules, wherein said first module determines whether said BUSY line is asserted, wherein said BUSY line indicates whether any of said plurality of modules is transmitting on said message bus;

wherein said first module requests ownership of said message bus by sending a request on said first signal line if said BUSY line is not asserted.

12. The system of claim 11, wherein said first module asserts said BUSY line to indicate ownership of said message bus after said second signal line indicates that said message bus is granted to said first module.

13. The system of claim 11, wherein said first module sends a control packet on said message bus, wherein said control packet contains a first address representing an address of said second module and a number of packets to be transferred, wherein one bit of said control packet is sent on said first signal line and another bit of said control packet is sent on said second signal line.

14. The system of claim 13, wherein said second module receives said control packet and determines that said number of packets are directed to said second module by comparing said first address to a self address of said second module, said second module asserting a TRDY line to indicate that said second module is ready to receive said number of packets, wherein said first module sends said number of data packets on said message bus upon assertion of said TRDY line.

15. The system of claim 14, wherein said second module determines whether an uncorrectable error is present in a first packet, wherein said first packet is comprised in said number of data packets, said second module asserting a ERR signal line in said message bus to indicate presence of said uncorrectable error, wherein said first module sends said first packet again upon said ERR signal line being asserted.

16. The system of claim 15, wherein said second module receives said first packet again and asserts said ERR signal line and a STOP signal if an uncorrectable error is detected again in said second module, wherein transferring said number of data packets is terminated by said first module upon assertion of said ERR signal line and said STOP signal.

* * * * *